(12) United States Patent
Wyse et al.

(10) Patent No.: US 9,432,126 B1
(45) Date of Patent: Aug. 30, 2016

(54) RECONFIGURABLE FILTER

(71) Applicants: Russell D. Wyse, Center Point, IA (US); Michael L. Hageman, Mt. Vernon, IA (US)

(72) Inventors: Russell D. Wyse, Center Point, IA (US); Michael L. Hageman, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/314,207

(22) Filed: Jun. 25, 2014

(51) Int. Cl.
*H04B 10/69* (2013.01)

(52) U.S. Cl.
CPC ..................... *H04B 10/69* (2013.01)

(58) Field of Classification Search
CPC ............... H04B 10/69–10/6973; H04B 10/60; H04B 10/66; H04L 7/0079; H04L 27/06; H04L 27/38
See application file for complete search history.

(56) References Cited

U.S. PATENT DOCUMENTS

| | | | | |
|---|---|---|---|---|
| 5,500,757 | A * | 3/1996 | De Blok | 398/202 |
| 5,828,476 | A * | 10/1998 | Bonebright et al. | 398/136 |
| 6,392,219 | B1 * | 5/2002 | McCormick et al. | 250/214 R |
| 6,781,468 | B1 * | 8/2004 | Robinson | H03F 1/565 250/214 A |
| 2003/0174023 | A1 * | 9/2003 | Miyasita | H03F 3/45085 330/254 |
| 2007/0086791 | A1 * | 4/2007 | Noya | H04B 10/66 398/202 |
| 2007/0263673 | A1 * | 11/2007 | Agazzi | H03M 1/0624 370/516 |
| 2007/0285296 | A1 * | 12/2007 | Bilhan | H03M 1/0629 341/155 |
| 2008/0031633 | A1 * | 2/2008 | Hoshida et al. | 398/149 |
| 2008/0212716 | A1 * | 9/2008 | Miremadi | H04B 10/695 375/319 |
| 2010/0054758 | A1 * | 3/2010 | Ereifej | H04B 10/296 398/202 |
| 2010/0092186 | A1 * | 4/2010 | Takahara | H04B 10/695 398/208 |
| 2010/0109710 | A1 * | 5/2010 | Morisson | 327/94 |

OTHER PUBLICATIONS

U.S. Appl. No. 13/714,209, filed Dec. 13, 2012 "Ultra-Precision Linear Phase Shifter With Gain Control".

* cited by examiner

*Primary Examiner* — David Payne
*Assistant Examiner* — Casey Kretzer
(74) *Attorney, Agent, or Firm* — Daniel M. Barbieri; Donna P. Suchy; Angel N. Gerdzhikov

(57) ABSTRACT

A receiver includes an interface for translating an optical signal into two differential electrical signals for a first amplifier. The first amplifier modifies the two differential electrical signals to produce a first signal that is the amplitude of difference between the two differential electrical signals, which contains the information from the optical signal. A variable gain track and hold amplifier (VGTHA) receives the first signal and a clock signal and provides a conditioned analog signal for digital processing. A clock source provides the clock signal, which is aligned with the peak amplitude of the first signal.

20 Claims, 5 Drawing Sheets

RECONFIGURABLE FILTER

BACKGROUND

Optical signals are increasingly being used to communicate between electronic processing elements. In certain applications, large amounts of information need to be processed together, thereby creating a need to process many optical signals. If such processing is to be done electronically, it is necessary to convert large numbers of optical signals to electrical signals, and then to process the resulting electrical information. Given the speed limitations of the electrical domain compared to the optical domain, it may be necessary to add in artificial delays in the received signal for the downstream digital sampling to keep up.

SUMMARY

A receiver for translating a single-ended optical signal into a conditioned analog signal for digital processing is disclosed. The receiver includes an interface for translating the optical signal into two differential electrical signals. A first amplifier coupled to the interface receives the two differential electrical signals and modifies them to produce a first signal that is the difference between the two differential electrical signals. The first signal is the amplitude of the difference between the two differential electrical signals and contains the information from the optical signal.

A second amplifier implemented as a variable gain track and hold amplifier (VGTHA) receives the first signal and provides the conditioned analog signal for digital processing. The second amplifier receives a clock signal from a clock source and provides the conditioned analog signal in response to the timing from of the clock signal.

The clock source includes a photo diode to translate the optical signal to an electrical signal. A filter receives the electrical signal and produces a sine wave at a fundamental frequency of the optical signal. A delay circuit, which can be implemented as a phase shifter, receives the sine wave and aligns the sign wave with the peak amplitude of the first signal. A buffer receives the aligned sine wave and translates it to a square wave clock signal for the VGTHA.

These and other aspects, features, and advantages of the disclosure will become apparent upon review of the following description taken in connection with the accompanying drawings. The disclosure, though, is pointed out with particularity by the appended claims.

DETAILED DESCRIPTION

Figure 1:
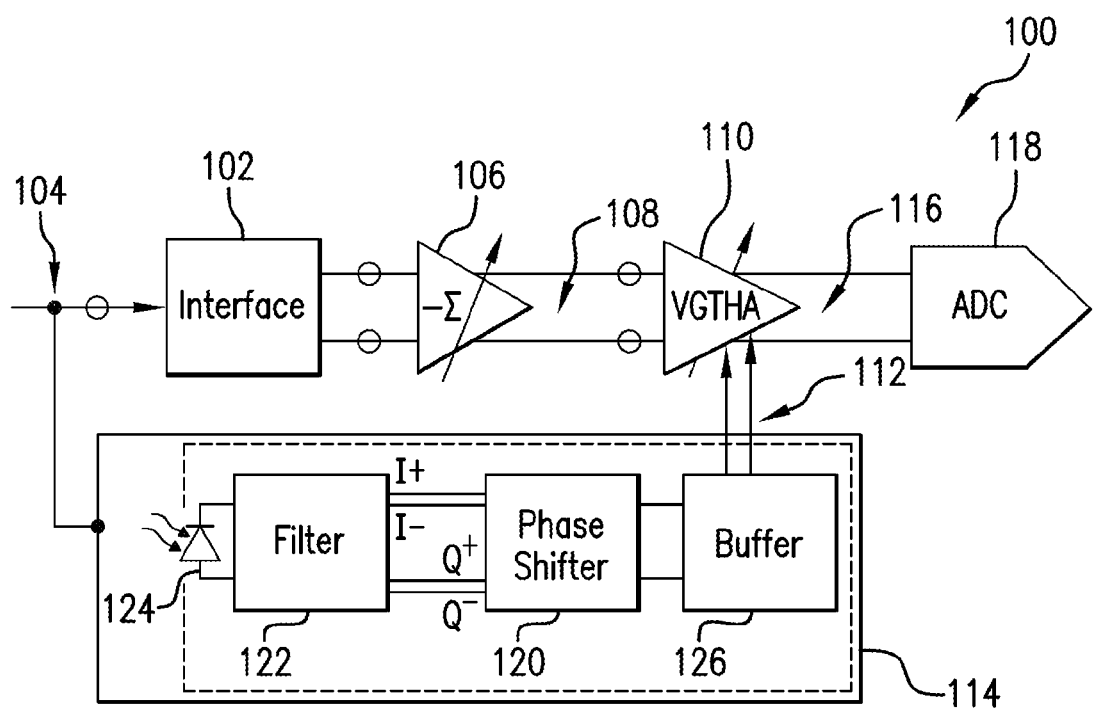
FIG. 1 is a block diagram of a receiver operating in accordance with an implementation of the present disclosure.

FIG. 1 shows a block diagram of a receiver 100 operating in accordance with an implementation of the present disclosure. In one implementation, receiver 100 can receive a single-ended optical signal and translate the optical signal to an AC coupled differential electrical signal to couple the optical signal to the electronic circuitry for fast and accurate digitization of the analog signal.

Receiver 100 can include an interface 102 for translating an input signal 104, which can be electrical or optical and single-ended or differential, into a differential electrical signal. Information in the input signal can be found in the energy and/or amplitude of an optical waveform, or the amplitude and/or phase of an electrical waveform. The information is obtained from the differential electrical signal by a first amplifier 106, which can be a differential subtractor amplifier or a differential adder amplifier. First amplifier 106 provides a first signal 108 proportional to input signal 104 that contains the information in optical domain that stimulated diodes. First signal 108 is provided to a second amplifier, which can be implemented as a variable gain track and hold amplifier (VGTHA) 110, that also receives a clock signal 112 from a clock source 114 that, based on the timing of clock signal 112, provides a conditioned analog signal 116 with information from first signal 108, which corresponds with the information in input signal 104, for digitizing by an analog to digital converter (ADC) 118.

Figure 2:
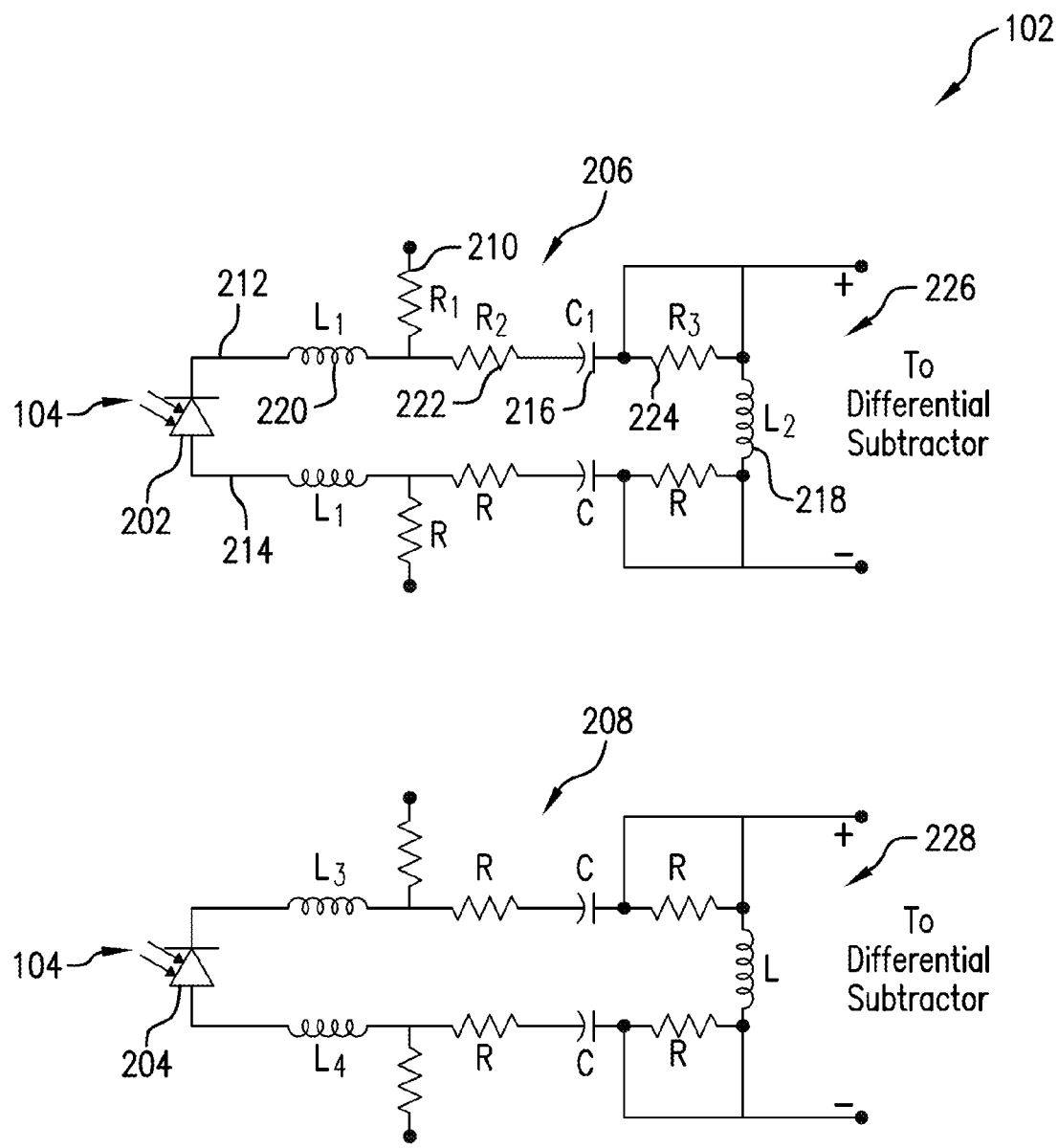
FIG. 2 is a schematic diagram of the interface shown in FIG. 1.

More specifically, in one implementation, interface 102 translates a single-ended optical signal into a differential electrical signal. Input signal 104 can include two optical signals on two separate feeds. Interface 102 includes a pair of photo diodes 202 and 204, shown in FIG. 2, that each receives one of the two optical signals in input signal 104. Photo diodes 202 and 204 can be differential photo diodes 202 and 204, and produce two differential electrical signals proportional to the optical input signal 104. Photo diodes 202 and 204 are each connected to a differential conditioning circuit 206 and 208, respectively, which are the same, so for brevity only differential conditioning circuit 206 is explained.

Differential conditioning circuit 206 includes two paths 212 and 214 connected to opposite ends (the anode and cathode) of photo diode 202. Each path 212 and 214 has similar circuit elements to operate substantially similar in the RF signal level, but the DC voltage difference between paths 212 and 214 is large to properly bias the photo diodes. Only path 212 is described with the understanding path 214 has the same corresponding circuit elements. Path 212 includes a resistor 210 connected to a DC bias source for providing the DC reverse bias for photo diode 202. Photo diode 202 may require 4V DC or more across its ports for operation which creates a 4V DC difference between paths 212 and 214. The DC and low frequency portions of the signal are removed so that these portions of the signal are not amplified by the voltage gain of first amplifier 106 and VGTHA 110. A capacitor 216 is provided in series in path 212 to block the DC portion of the signal. An inductor 218 connects paths 212 to path 214. Inductor 218 can be sized to correspond with the other resistors and capacitors in differential conditioning circuit 206 to provide a time constant to force the DC voltage in differential conditioning circuit 206 to zero after each impulse of optical input signal 104 to remove any DC offset. This effectively removes any memory (i.e. lingering DC signal components) that may cause the output signal to drift over time and inject error into the output signal.

Optical input signal 104 behaves similar to an impulse response with energy at harmonics of the fundamental pulsing rate, e.g. at 8 Gs sampling rate there would be energy at 8, 16, 24 . . . . Consequently, each impulse in the waveform of input signal 104 can cause unwanted ringing in differential conditioning circuit 206 that will remain long after the arrival of each impulse. The unwanted ringing in differential conditioning circuit 206 is dampened by carefully selecting the time constants created by the combination of capacitors, inductors, and resistors in differential conditioning circuit 206.

Figure 3:
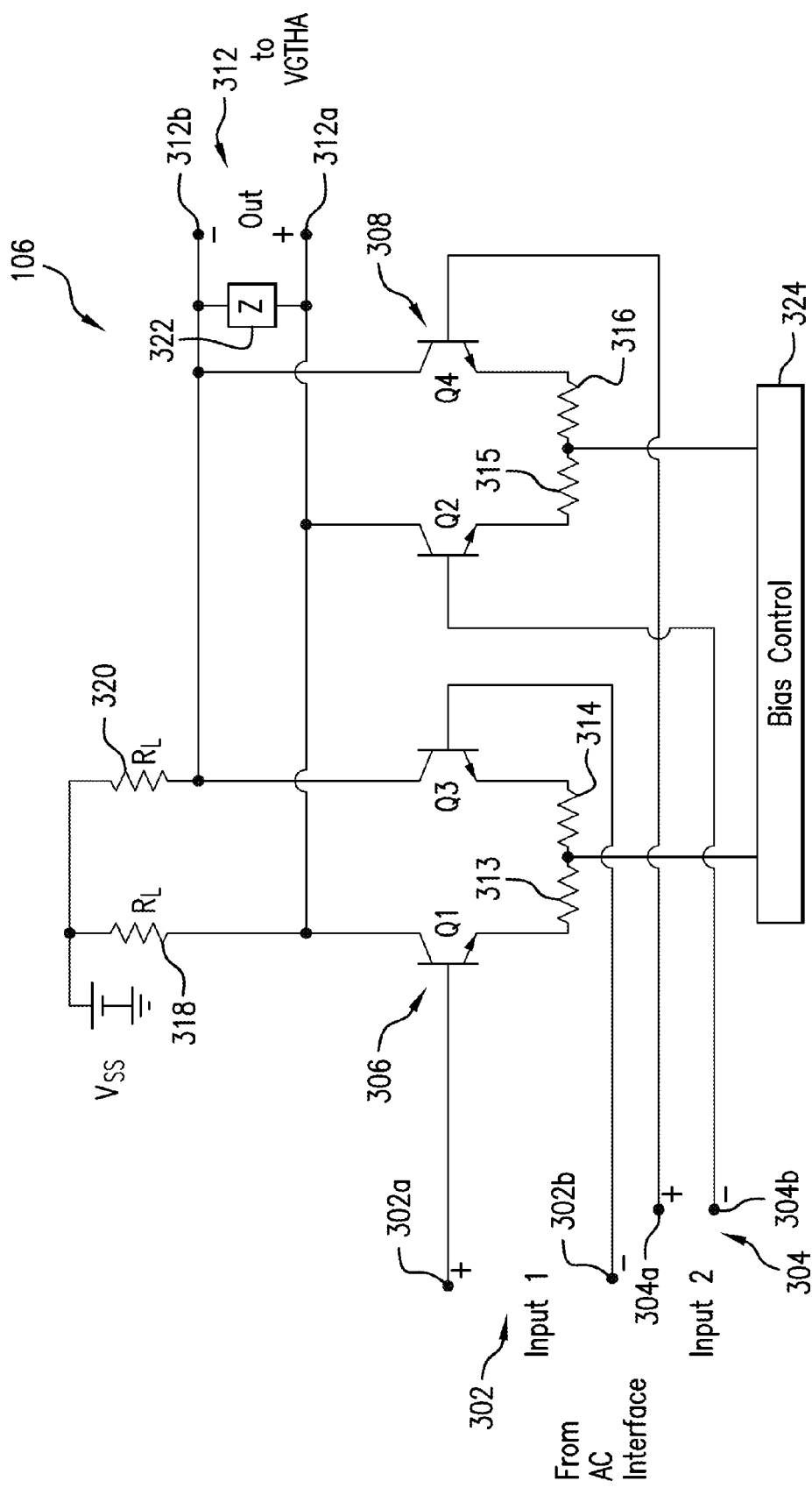
FIG. 3 is a schematic diagram of the differential subtractor amplifier shown in FIG. 1.

Each differential conditioning circuit 206 and 208 provides a normalized, differential electrical signal 226 and 228, respectively, that are provided to a first input port 302 and a second input port 304 of first amplifier 106, respectively, as shown in FIG. 3, in order to obtain the difference between two differential electrical signals 226 and 228. The information from input signal 104 with two optical signals on two separate feeds is found in the difference of the amplitude of differential electrical signals 226 and 228. First amplifier 106 subtracts differential electrical signal 226 at first input port 302 from differential electrical signal 228 at second input port 304.

First amplifier 106 comprises two pairs of differential transistors 306 (Q1, Q3) and 308 (Q2, Q4) each connected to a DC load, resistors 318 and 320, respectively. Each differential transistor pair 306 and 308 have their emitters connected together through resistors 313, 314 and 315, 316, respectively, and to a bias source 324 to establish the appropriate operating conditions and linearity control to keep the transistors in each differential transistor pair 306 and 308 operating in the active region of operation where the transistors have gain.

Differential output 312 is provided by the collectors of transistors Q1, Q2 tied together with the positive output port 312a of differential output 312 and collectors of transistors Q3, Q4 tied together with the negative output port 312b of differential output 312. Each collector of the two transistors comprising differential transistor pair 306 is coupled to a corresponding one of the two transistors comprising differential transistor pair 308. The bases of the transistors in differential transistor pair 306 (Q1, Q3) are connected to one of the two differential first input port 302 (302a, 302b). Similarly, the bases of the transistors in differential transistor pair 308 (Q2, Q4) are connected to one of the two differential input ports 304a, 304b.

The transistors with their collectors tied together (Q1, Q2 and Q3, Q4) and combined with one of the two differential output ports 312a, 312b also have their bases tied to one of the two differential ports in first input port 302 and one of the two differential ports in second input port 304. Transistor Q1 has its base tied to a positive port 302a of first input port 302 and transistor Q2 has its base tied to a negative port 304b of second input port 304, similarly transistor Q3 has its base tied to a negative port 302b of first input port 302 and transistor Q4 has its base tied to a positive port 304a of second input port 304. When the input signal at first input port 302 and the input signal at second input port 304 are both positive and equal amplitude there will be an equal positive shift in voltage signal at the bases of transistors Q1 and Q4 and negative shift in bases of transistors Q2 and Q3. Because transistors Q1 and Q2 have their collectors tied to the same ports The decreasing collector current in Q2 subtracts from the increasing collector current in Q1, thus canceling the output signal.

An impedance 322 may be connected in shunt across differential output 312 to force the signal at differential output 312 to zero after each impulse of optical input signal 104 to remove any DC offset.

In an alternative implementation for obtaining the relationship between two differential electrical signals 226 and 228, first amplifier 106 can be a differential adder amplifier. A differential adder amplifier is implemented similar to the differential subtractor amplifier, except the input polarities or the polarities of the collectors can be switched. The differential adder amplifier adds the input signal at one of first input port 302 and second input port 304 with the other one of first input port 302 and second input port 304 to add the two input signals and find the sum of the amplitude of differential electrical signals 226 and 228.

The signal at differential output 312 tracks the photo diode electrical response of the input signal 104 that includes two optical signals on two separate feeds or proportional to the phase or energy of input signal 104. The signal at differential output 312 is provided to the VGTHA 110 to slow the processing down to correspond with the sampling rate of ADC 118. Photo diodes can operate with rise and fall times that are faster than 10 pico-seconds and contain information through frequencies higher than 1 terahertz, which is presently much faster than the sampling rate of any ADC 118, and therefore, without slowing the processing of receiver 100 down some information in the optical input signal 104 may be lost.

Figure 4:
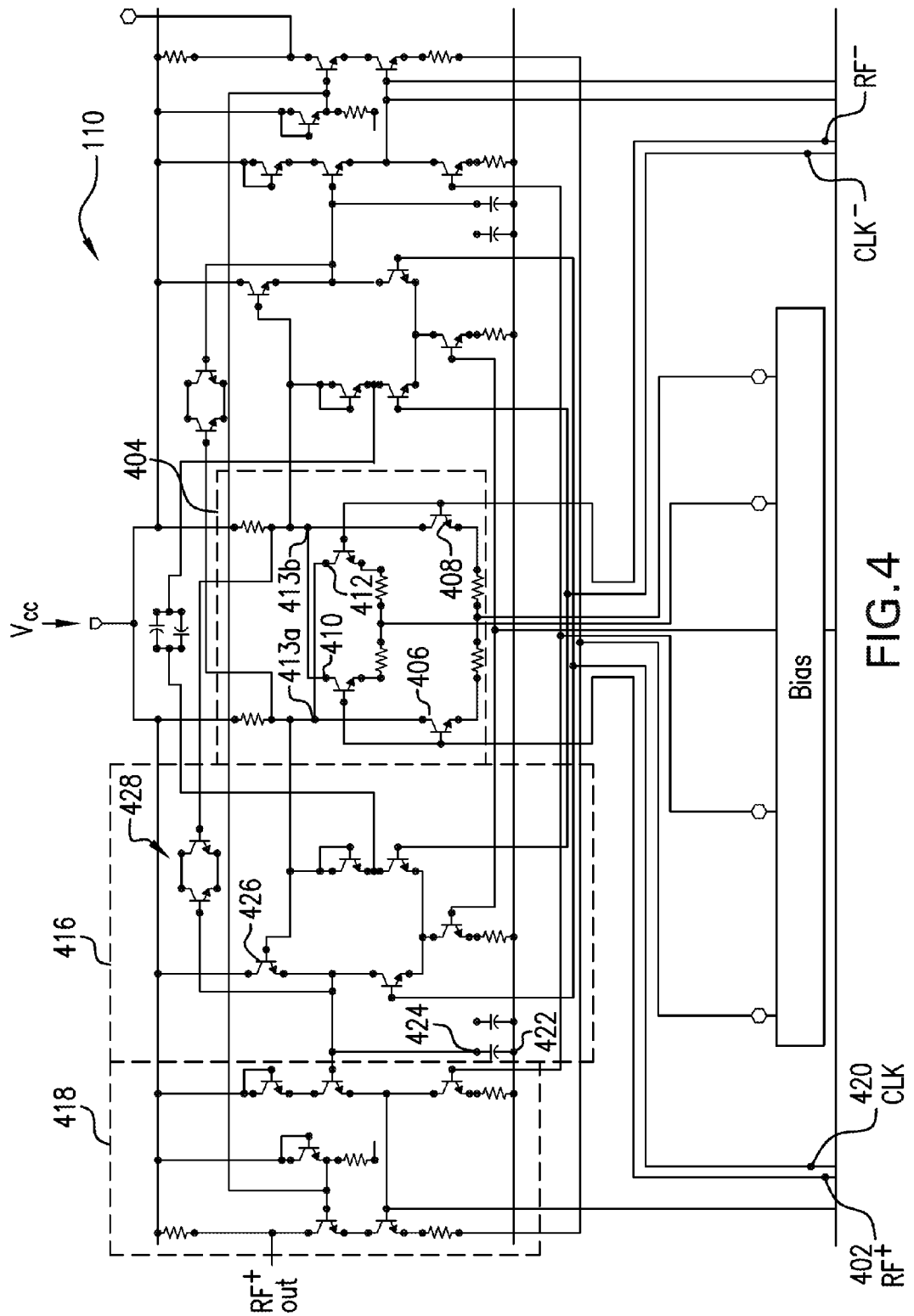
FIG. 4 is a schematic diagram of the variable gain track and hold amplifier shown in FIG. 1.

FIG. 4 shows second amplifier implemented as a variable gain track and hold amplifier 110 (VGTHA). VGTHA 110 can amplify or attenuate the first signal with precise variable gain and capture and hold the first signal 108 from first amplifier 106, and provide information from first signal 108, such as the amplitude of first signal 108, as a conditioned analog signal 116 to ADC 118. VGTHA 110 incorporates both variable gain and track and hold ability in a single circuit element. First signal 108 is received at input ports 402 of VGTHA 110, and provided to an input section 404.

Input section 404 includes two pairs of transistors: transistors 406, 408 and transistors 410, 412. The emitters of each of the dual transistor pairs 406, 408 and 410, 412 are coupled, respectively through resistors. The bases of each transistor in the two transistor pairs (406, 408 and 410, 412) are cross coupled with each other so the bases of transistors 406, 410 and 408, 412 are coupled, respectively to receive the differential RF signal (first signal 108). The collector of each transistor in the two transistor pairs (406, 408 and 410, 412) are cross coupled with each other so the collector of transistors 406, 412 and 408, 410 are coupled, respectively to a differential output port 413a and 413b, respectively.

Variable gain is achieved by raising the transconductance of transistors 406, 408 with respect to transistors 410, 412. With transistor 406 operating with a zero bias current going through it, the transconductance of transistor 406 will be zero and there will be no current change in the collector of 406 with an input voltage. Transistor 412 will have full bias current going through it with a maximum transconductance. Thus, the gain of the output signal of input section 404 at output ports 413a, 413b where the collectors of transistors 406 and 412 are tied together is the combined transconductance of transistor 412 minus the transconductance of transistor 406. This is where VGTHA 110 operates with the highest gain. Increasing the bias current through transistor 406 will increase its transconductance, and thus lower the gain of VGTHA 110.

The differential output 413a, 413b of input section 404 is provided to corresponding clocked buffers 416 and then to output section 418. Each leg of the differential output from input section 404 is the same, so for brevity only one leg of VGTHA 110 is described with the understanding that the other leg of the differential legs is the same.

Buffer 416 receives one leg of the differential output of input section 404 and based on clock signal 112 at clock input port 420 from clock source 114 alternatingly charges and discharges a capacitor 424 in timing circuit 422. Capacitor 424 is typically charged through a switching element such as a diode or the base-emitter junction of bipolar transistor 426 based on the timing of clock signal 112; for example, as clock signal 112 is increasing in amplitude until clock signal 112 reaches its peak amplitude. When the switching element is "ON," current flows to capacitor 424, allowing its voltage to follow that of the input signal. When the switching element is "OFF," current flow to capacitor 424 is disabled. The switching element, i.e. transistor 426, is turned "OFF" at the peak of the amplitude signal of clock signal 112 so that the voltage in capacitor 424 can have the same value as the peak amplitude of input signal 104. The amplitude information stored in timing circuit 422 is provided to output section 418 of VGTHA 110, which provides as its output conditioned analog signal 116, which can correspond with the information in input signal 104 (i.e., peak amplitude or phase or energy of input signal 104), for digitizing by ADC 118.

A feed through circuit 428 is provided to balance the parasitic capacitance that arises in the transistors of VGTHA 110 from the high frequency transitions of clock signal 112. Feed through circuit 428 is cross coupled with the opposite side of the differential leg to absorb the energy in clock signal 112 so that it does not feed into VGTHA 110.

Aligning the clock signal 112 from clock source 114 with the peak amplitude of the input signal is done by a delay circuit that inserts a time delay or a phase shift into input signal 104. The delay circuit can be implemented as a phase shifter 120. FIG. 1 shows one implementation for a clock source 114 incorporating a phase shifter. Input signal 104 can be electrical or optical and single-ended or differential. In the illustrated implementation with input signal 104 being an optical input signal, a photo diode 124 receives input signal 104 and translates it to an electrical signal. In an alternative implementation, an electrical signal corresponding to an optical input signal 104 can be fed to filter 122 from one of photo diodes 202, 204 in AC interface 102, shown in FIG. 2.

The output photo diode 124 includes multiple harmonics above the fundamental frequency of input signal 104. A filter 122 removes all but the fundamental frequency to produce a sine wave at that fundamental frequency with two differential outputs for the I and Q components of the sine wave. A phase shifter 120 aligns the sine wave with the peak amplitude of input signal 104 captured by first amplifier 106.

Figure 5:
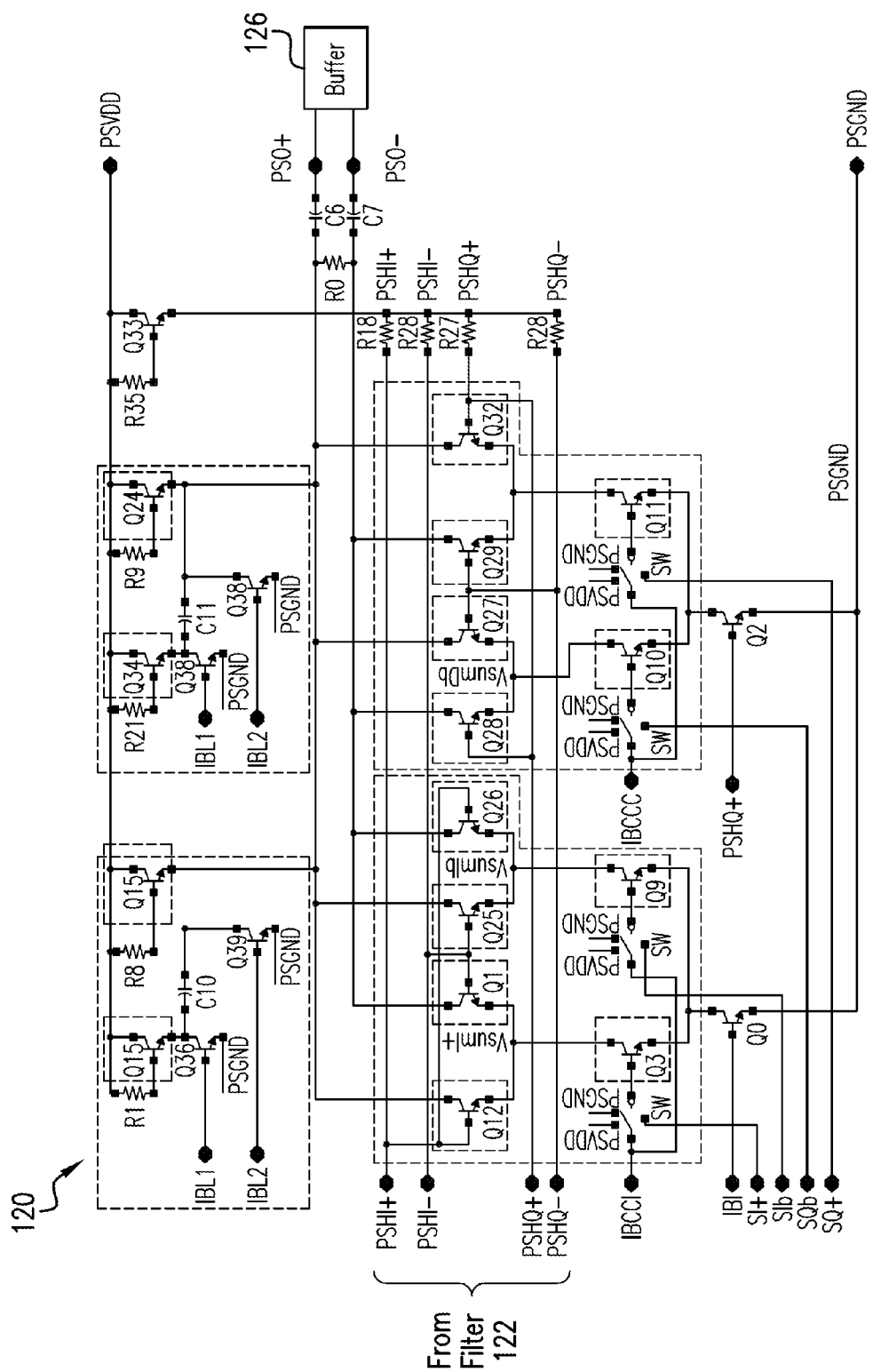
FIG. 5 is a block diagram of the clock of FIG. 1.

Phase shifter 120 is generally configured to receive the I and Q components of the sine wave from filter 122 and to output a phase-shifted combination of the input signal's components. An exemplary phase shifter 120, shown in FIG. 5, is discussed in more detail in U.S. non-provisional patent application titled, "ULTRA-PRECISION LINEAR PHASE SHIFTER WITH GAIN CONTROL," Ser. No. 13/714,209, filed on Dec. 13, 2012, the contents of which are hereby incorporated by reference in its entirety.

Phase shifter 120 phase-shifts the sine wave to derive the clock signal used to drive VGTHA 110. A buffer 126 receives the phase-shifted sine wave from phase shifter 120 and converts the signal to a square wave, clock signal 112 for VGTHA 110.

Reference has been made to several components throughout this disclosure as though each component is a unique component. One skilled in the art will readily recognize, however, that the various systems, circuits, components, and controllers can be incorporated into one or more other systems, circuits, components, and controllers thereby reducing the number of components. One skilled in the art will further recognize that various systems, circuits, components, and controllers can be replaced with other systems, circuits, components, and controllers with similar functionality without departing from the scope of this disclosure; for example, clock source 114 can be replaced with a variety of clock implementations and various other implementations of first amplifier 106 and second amplifier can be exchanged to produce a receiver with the desired characteristics of the receiver herein described.

Reference may also have been made throughout this disclosure to "one implementation," "an implementation," or "implementations" meaning that a particular described feature, structure, or characteristic is included in at least one implementation of the present disclosure. Thus, usage of such phrases may refer to more than just one implementation. Furthermore, the described features, structures, or characteristics may be combined in any suitable manner in one or more embodiments. Any ranges given herein include any and all specific values within the range and any and all ranges within the given range.

While the present disclosure has been particularly shown and described with reference to exemplary implementations thereof, it should be understood by those of ordinary skill in the art that various changes, substitutions and alterations can be made herein without departing from the scope of the disclosure as defined by the appended claims and their equivalents.

What is claimed is:

1. A receiver for translating an input signal to a conditioned analog signal for digital processing, the receiver comprising:
a first amplifier receiving the input signal as two differential input signals and modifying the two differential input signals for providing a difference between the two differential input signals as a first signal;
a clock source for providing a clock signal;
a second amplifier receiving the clock signal from the clock source and the first signal from the first amplifier and holding information in the first signal in response to a timing of the clock signal and providing the conditioned analog signal with information from the first signal.

2. The receiver of claim 1, and further comprising an interface for translating the input signal which is a single-ended optical signal into a differential electrical signal.

3. The receiver of claim 2, wherein the interface further comprises two differential photo diodes to produce two differential electrical signals.

4. The receiver of claim 3, wherein the first amplifier is a differential subtractor amplifier that receives and subtracts the two differential electrical signals from each other to determine an amplitude of the difference between the two differential electrical signals.

5. The receiver of claim 4, wherein the first amplifier comprises two differential transistor pairs each to receive one of the two differential electrical signals.

6. The receiver of claim 5, wherein the second amplifier is a variable gain track and hold amplifier, wherein the timing of the clock signal corresponds to the clock signal reaching a peak amplitude, and wherein at the peak amplitude of the clock signal, the second amplifier provides the conditioned analog signal with information from the first signal.

7. The receiver of claim 6, and further comprising a delay circuit for receiving the clock signal and delaying the clock signal to align the peak amplitude of the clock signal with the peak amplitude of the input signal.

8. The receiver of claim 7, wherein the clock source further comprises a photo diode to translate an optical signal to an electrical signal, a filter to receive the electrical signal and produce a sine wave at a fundamental frequency of the optical signal, and wherein the delay circuit is a phase shifter that receives sine wave and aligns the sine wave with the peak amplitude of the input signal and produce the clock signal.

9. The receiver of claim 1, wherein the second amplifier is a variable gain track and hold amplifier (VGTHA), wherein the VGTHA further comprises an input section having two pairs of transistors with each transistor having a base, an emitter, and a collector, wherein the emitter of each transistor in each pair is coupled, the base of each transistor in the two transistor pairs are cross coupled with each other to receive the first signal, and the collector of each transistor in the two transistor pairs are cross coupled with each other to provide an output signal of the input section of the VGTHA.

10. The receiver of claim 9, wherein the VGTHA further comprises clocked buffers combined to the input section to receive the output signal of the input section and combined to the clock source to receive the clock signal and provide the conditioned analog signal.

11. A receiver for translating an input signal to a conditioned analog signal for digital processing, the receiver comprising:
    an interface for translating an optical signal into two differential electrical signals;
    a first amplifier receiving the two differential electrical signals and subtracting the two differential electrical signals for providing a first signal with an information from the optical signal;
    a clock source for providing a clock signal; and
    a second amplifier receiving the clock signal from the clock source and the first signal from the first amplifier and holding the information in response to a timing of the clock signal and providing the conditioned analog signal with the information from the optical signal.

12. The receiver of claim 11, wherein the information from the optical signal is in an amplitude of the difference between the two differential electrical signals, and the two differential electrical signals are substantially the same.

13. The receiver of claim 11, wherein the clock source further comprises a photo diode to translate an optical signal to an electrical signal, a filter to receive the electrical signal and produce a sine wave at a fundamental frequency of the optical signal, and a phase shifter that receives sine wave and aligns the sine wave with a peak amplitude of the difference between the two differential electrical signals and produce the clock signal.

14. The receiver of claim 11, wherein the second amplifier is a variable gain track and hold amplifier (VGTHA), wherein the VGTHA further comprises an input section having two pairs of transistors with each transistor having a base, an emitter, and a collector, wherein the emitter of each transistor in each pair is coupled, the base of each transistor in the two transistor pairs are cross coupled with each other to receive the first signal, and the collector of each transistor in the two transistor pairs are cross coupled with each other to provide an output signal of the input section of the VGTHA.

15. The receiver of claim 14, wherein the VGTHA further comprises clocked buffers combined to the input section to receive the output signal of the input section and combined to the clock source to receive the clock signal and provide the conditioned analog signal.

16. The receiver of claim 11, wherein the second amplifier is a variable gain track and hold amplifier, wherein the timing of the clock signal corresponds to the clock signal reaching a peak amplitude, and wherein at the peak amplitude of the clock signal, the second amplifier provides the conditioned analog signal with the information from the optical signal.

17. A receiver for translating an optical signal to a conditioned analog signal for digital processing, the receiver comprising:
    an interface for translating the optical signal into two differential electrical signals;
    a first amplifier receiving the two differential electrical signals and modifying the two differential electrical signals for providing a difference between the two differential electrical signals as a first signal;
    a clock source for providing a clock signal;
    a delay circuit for receiving the clock signal and delaying the clock signal to align a peak amplitude of the clock signal with the first signal; and
    a second amplifier receiving the clock signal from the clock source and the first signal from the first amplifier and holding information in the first signal in response to a timing of the clock signal and providing the conditioned analog signal with information from the first signal.

18. The receiver of claim 17, wherein the second amplifier is a variable gain track and hold amplifier (VGTHA), wherein the VGTHA further comprises an input section having two pairs of transistors with each transistor having a base, an emitter, and a collector, wherein the emitter of each transistor in each pair is coupled, the base of each transistor in the two transistor pairs are cross coupled with each other to receive the first signal, and the collector of each transistor in the two transistor pairs are cross coupled with each other to provide an output signal of the input section of the VGTHA.

19. The receiver of claim 18, wherein the clock source further comprises a photo diode to translate an optical signal to an electrical signal, a filter to receive the electrical signal and produce a sine wave at a fundamental frequency of the optical signal, and wherein the delay circuit is a phase shifter that receives sine wave and aligns the sine wave with the peak amplitude of the first signal and produce the clock signal.

20. The receiver of claim 19, wherein the first amplifier is a differential subtractor amplifier that receives and subtracts the two differential electrical signals from each other to determine an amplitude of the difference between the two differential electrical signals.

* * * * *